Feb. 20, 1934.   F. GÜHLOFF   1,947,591
AUTOMATICALLY ACTING, MARKING, AND CUTTING DEVICE FOR MACHINES
FOR PRODUCING AND TREATING STRIP-SHAPED BODIES
Filed Sept. 26, 1932

Inventor:
Fritz Gühloff
By B. Singer, atty.

Patented Feb. 20, 1934

1,947,591

UNITED STATES PATENT OFFICE 1,947,591

AUTOMATICALLY ACTING, MARKING, AND CUTTING DEVICE FOR MACHINES FOR PRODUCING AND TREATING STRIP-SHAPED BODIES

Fritz Gühloff, Berlin-Reinickendorf, Germany

Application September 26, 1932, Serial No. 634,991, and in Germany October 30, 1931

6 Claims. (Cl. 271—2.4)

The present invention relates to an automatically acting marking and cutting device for machines for producing and treating strip-shaped bodies, such as for instance produced by veneer peeling machines.

Marking and cutting devices for veneer peeling machines and similar machines are known at which the marking or cutting member is controlled and released directly by the veneer strip passing through the machine. Devices of this kind do, however, require working tables of great length and in order to avoid this drawback it has been proposed to control the length of the strip (for instance a veneer strip) by means of a counter roller or the like which is operated by the respective strips and the rotation of which is transmitted to a counter or meter, which may be set for any desired length of material and which controls the cutting or marking member. However, also this arrangement possesses several drawbacks. Previous to each release of the cutting or marking member a number of stops corresponding to the number of counter dials (for instance unit dials, tenth dials and hundredth dials) must be set. This setting of the stops is a rather cumbersome operation, which renders it difficult to maintain with accuracy the previously set marking or cutting length. Moreover, the previously set cutting lengths are strongly influenced by the inertia forces occurring, at the relatively high feeding speed.

The main object of the present invention is to provide an automatically acting cutting and marking device of improved construction, which will overcome the above named difficulties.

According to this invention, a stop is provided, which is moved by the strip of material proper or by the feeding mechanism, over an intermediate reducing gear, and in the path of this stop an adjustable counter stop is arranged which is adapted to interrupt the feed of material, for instance by mechanical, pneumatic or electrical means, as soon as the first stop has advanced over the adjusted length and abuts against the counter stop. The counter stop usually employed is of key-like shape and is set or adjusted in the same manner as a key, but it will be evident that also counter stops of other shapes may be used. Instead of a single counter stop a plurality of adjustable stops, each corresponding to a definite cutting or marking length, may be arranged in the path of the driven stop. The distance between the driven stop and each individual counter stop or all counter stops in common may be adjusted before operation commences, for instance by balancing the inertia effect of the feeding mechanism or the marking or cutting length.

The invention is illustrated by way of example in the accompanying drawing.

Figure 1:
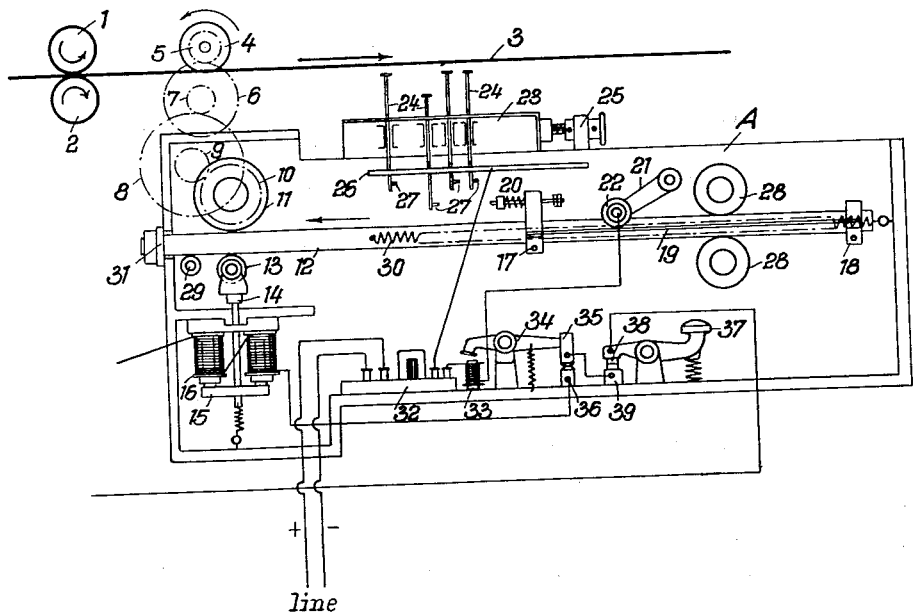
Fig. 1 shows schematically a constructional form of the invention comprising an electrically released feeding mechanism.

In Fig. 1, 3 denotes a strip of material, which is advanced over the casing A by means of rollers 1 and 2. The rollers 1 and 2 are controlled by a magnet 16, which is connected with the rollers by means of an intermediate mechanism of known kind (not shown). When the magnet is de-energized and drops its armature the said known mechanism will stop the rollers and the strip 3 will be marked or severed. When the magnet again attracts its armature the said known mechanism will again start the rollers and the strip 3 is again fed forward in the direction of the arrow. The strip 3 supports a roller 4, which is rotated when the strip moves and the rotation of the roller 4 is by means of a reversing gear 5—10 transmitted to a roller 11, which is rigidly fixed to the wheel 10. If, for instance, the roller 4 makes 10 revolutions when a strip of 2500 mm. length passes the machine and the gear ratio of the reversing gear 5—10 is 1:10, the path described by a point on the periphery on the roller 11 would amount to 250 mm. only (provided the diameter of the roller 11 equals the diameter of the roller 4). It is, therefore, evident that the device according to the invention is of relatively short length and may be easily controlled by the operator. In the upper part of the device a key-casing 23 is arranged, in which the keys 24 are located. Each key may be adjusted independently of the other keys. By means of a spindle and a wheel 25 the casing 23 together with the keys 24 may also be adjusted jointly, in order to correct for total differences. If desired, also each key may be arranged in such a manner in the casing, that it may be adjusted in the length direction of the latter. This possibility of adjustment is of particular importance since it makes it possible to maintain the previously set marking or cutting length accurately without risking that the adjustments are altered by the inertia effect. As will be known this inertia effect is dependent upon the feed speed at any moment. The keys 24 are arranged in such a manner that only a single key may be pressed downward at a time. If a second key is pressed the keys formerly pressed down will automatically be forced upwards. When the plate-shaped armature 15, the roller carrier 14 and the roller 13 are attracted by the magnet 16, the rod 12 will be forced along with the roller 13 through friction. The rollers 28 and 29 serve for maintaining the rod 12 in horizontal position.

If the roller 11 is rotated, the rod 12 will be moved in the direction of the arrow. If a key 24 is pressed down the resiliently arranged pin 20, which is carried by the block 17, will during its movement contact with the contact pin 27 on the key 24 whereby a weak current circuit is closed. This circuit, which for instance is branched off from the supply mains over a small transformer 32 (if three-phase or alternating current is used) or over a series resistance (if direct current is used), comprises a contact bar 26, which is conductively connected with all keys 24, a small magnet 33, a roller 22 suspended on a lever 21 and the part of the contact rail 19 lying between the blocks or clamps 17 and 18. When the said circuit is closed, the magnet 33 attracts the lever 34 and opens the energization circuit of the magnet 16 at the contacts 35, 36. The armature plate 15 is released and drops downward together with the rod 14 and the roller 13, whereby the feed rollers 1 and 2 are stopped by means of the above mentioned known mechanism (not shown) and the material strip 3 is stopped, so that a cut may be performed. Simultaneously the spring 30 will force the rod 12 back into its original position, whereby the weak current circuit is opened between 20 and 27 and the power or energization circuit of the magnet 16 again is closed at 35, 36, so that the magnet again attracts its armature and the described operations are repeated. During the short interval between two succeeding series of operations the material strip 3 is cut or marked. The movements of the rod 12 in the direction of the arrow are limited by a bumper 31. If it is desired to cut out some damaged section of the strip 3 and to mark this section with special marks, the key 37 is operated whereby the circuit of the magnet 16 is opened between the contacts 38 and 39, so that the rod 12 is released. This rod is now withdrawn into its original position without performing any measuring action, and the device may now, if desired, by means of the keys 24 be set for any other greater or shorter marking or cutting length by pressing the corresponding key.

Figure 2:
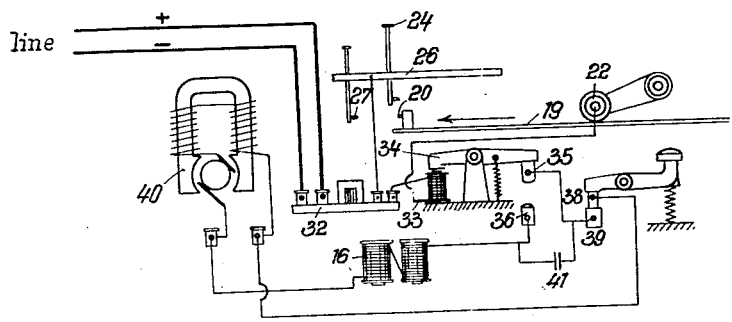
Fig. 2 is a wiring diagram.

According to Fig. 2 a dynamo 40 is provided which supplies the windings of the magnet 16 with strong current. When the circuit of this dynamo is closed, the strong current will flow from the dynamo through the windings of the magnet 16 and over the contacts 36, 35 and 39, 38 back to the other pole of the dynamo. A spark extinguisher in the form of a blocking condenser 41 is arranged in shunt with this circuit. The current supplied from the mains is as before mentioned applied over a small transformator 32 if three-phase or alternating current is used and over a series resistance if direct current is used. The secondary current from the transformer or the reduced current leaving the series resistance will flow over the contact rail 26 and the keys 24 to the contact points 27 and over the magnet 33, the roller 22 and the rail 19 to the resilient contact pin 20.

Various changes may be made in the form, arrangement and construction of the parts without departing from the spirit and scope of the invention.

I claim:—

1. A control system for stopping the feeding means for machines for producing and treating tape and strip shaped materials, such as produced by veneer peeling machines, comprising means for feeding a strip of material through the machine, a metering member, a reducing gear adapted to move said metering member when the strip of material is fed through the machine and individually operable key like means each representing a specific length and adapted to be placed in the path of said metering member and to automatically stop the same after it has travelled over a previously determined distance, and thereby simultaneously automatically stop the operation of said feeding means.

2. A control system for stopping the feeding means for machines for producing and treating tape and strip shaped materials, such as produced by veneer peeling machines, comprising means for feeding a strip of material through the machine, a metering member, a reducing gear adapted to move said metering member when the strip of material is fed through the machine and individually operable and adjustable key like means each representing a specific length and adapted to be placed in the path of said metering member and to automatically stop the same after it has travelled over a previously determined distance, and thereby simultaneously automatically stop the operation of said feeding means.

3. A control system for stopping the feeding means for machines for producing and treating tape and strip shaped materials, such as produced by veneer peeling machines, comprising means for feeding a strip of material through the machine, a metering member, a rod carrying said metering member, a reducing gear adapted to move said rod when the strip of material is fed through the machine, elements for retracting said rod into its original position when the feed of material is interrupted, adjustable key like means each representing a specific length and adapted to be individually placed in the path of said metering member and to automatically stop the same after it has travelled over a previously determined distance, and thereby simultaneously automatically stop the operation of said feeding means.

4. A control system for stopping the feeding means for machines for producing and treating tape and strip shaped materials, such as produced by veneer peeling machines, comprising means for feeding a strip of material through the machine, a metering rod, a reducing gear adapted to move said metering rod when the strip of materials is fed through the machine, an electromagnetic element adapted when energized to keep said rod in engagement with said gear, an energizing circuit for said electromagnetic element, an auxiliary circuit for controlling said energizing circuit and means adapted to operate automatically at each point, to close the auxiliary circuit, open the energizing circuit and interrupt the feed of material.

5. A control system for stopping the feeding means for machines for producing and treating tape and strip shaped materials, such as produced by veneer peeling machines, comprising means for feeding a strip of material through the machine, a metering rod, a reducing gear adapted to move said metering rod when the strip of material is fed through the machine, an electromagnetic element adapted when energized to keep said rod in engagement with said gear, an energizing circuit for said electromagnet, an auxiliary circuit for controlling said energizing circuit and a plurality of individually operable and adjustable key like members for determining the lengths, and a contact member fixed to said metering rod and adapted to contact with said key like members and thereby close the auxiliary circuit, open the energizing circuit and interrupt the feed of material.

6. A control system for stopping the feeding means for machines for producing and treating tape and strip shaped materials, such as produced by veneer peeling machines, comprising means for feeding a strip of material through the machine, a metering rod, a reducing gear adapted to move said metering rod when the strip of material is fed through the machine, an electromagnetic element adapted when energized to keep said rod in engagement with said gear, an energizing circuit for said electromagnet, an auxiliary circuit for controlling said energizing circuit and means adapted to operate automatically at each point, to close the auxiliary circuit, open the energizing circuit and interrupt the feed of material, and a manually operated switch in said energizing circuit for opening the same at any desired moment.

FRITZ GÜHLOFF.